United States Patent

[11] 3,538,833

| [72] | Inventor | Henry J. Koeber, Jr.<br>Deerfield, Illinois |
|---|---|---|
| [21] | Appl. No. | 735,232 |
| [22] | Filed | June 7, 1968 |
| [45] | Patented | Nov. 10, 1970 |
| [73] | Assignee | Bell & Howell Company<br>Chicago, Illinois<br>a corporation of Illinois |

[54] MANUAL CONTROL FOR SEMIAUTOMATIC FOCUSING MECHANISM FOR A CAMERA
8 Claims, 6 Drawing Figs.

| [52] | U.S. Cl. | 95/44,<br>352/140 |
|---|---|---|
| [51] | Int. Cl. | G03b 3/00 |
| [50] | Field of Search | 95/44, 45;<br>350/3, 8, 16, 41, 46; 353/101; 352/139, 140 |

[56] References Cited
UNITED STATES PATENTS

| 1,258,459 | 3/1918 | Read | 95/44(C) |
|---|---|---|---|
| 1,301,897 | 4/1919 | Becker | 95/44(C) |
| 2,456,317 | 12/1948 | Rabinow | 352/140X |
| 2,955,518 | 10/1960 | Perry | 350/187X |
| 3,450,018 | 6/1969 | John | 95/45 |

*Primary Examiner*—Norton Ansher
*Assistant Examiner*—Richard M. Sheer
*Attorneys*—William F. Pinsak and John E Peele, Jr.

ABSTRACT: An improved rangefinding mechanism for a camera having a focusable objective, the mechanism including a pendulous member operable on the principle of triangulation and releasable by an external control for orientation by gravity, and lockable in an oriented position. A spacer member is provided between a cam surface of the pendulous member and a control surface to maintain the objective at a predetermined distance from the cam surface to focus on a subject at a distance from the camera in response to orientation of the pendulous member. The mechanism also permits manual adjustment of the pendulous member.

Patented Nov. 10, 1970
3,538,833
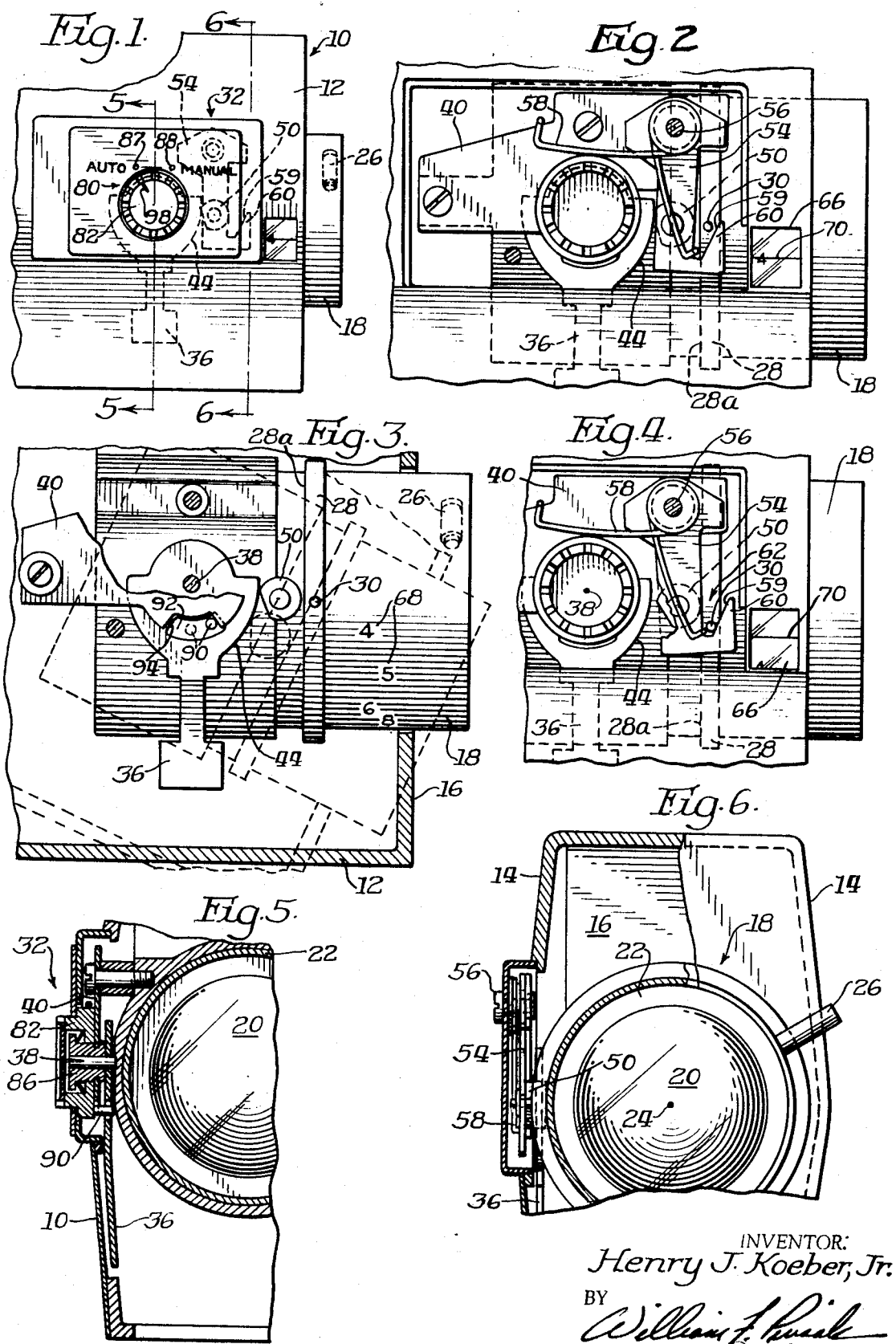
INVENTOR:
Henry J. Koeber, Jr.
BY
William J. Ruede
John E. Peele Jr. ATTYS

MANUAL CONTROL FOR SEMIAUTOMATIC FOCUSING MECHANISM FOR A CAMERA

The present invention relates to an improvement in a focusing mechanism for a camera having an objective lens which is adjustable according to focal distances which are determined by a pendulous range finder based upon the principle of triangulation. Particularly, the invention relates to a manual control device for overriding the semiautomatic focusing procedure for which the mechanism is intended.

Pendulous range finders for determining the focal distance between a camera and a subject are known. One such pendulous range finder for a triangulation focusing mechanism is described in a copending application filed by Henry J. Koeber on June 7, 1968, Ser. No. 735,231 titled CAMERA FOCUSING MECHANISM USING TRIANGULATION PRINCIPLE, and assigned to the assignee of the present application. That copending application discloses an improved pendulous range finder mechanism which can be used in a camera for fixing the position of an adjustable objective lens wherein that lens is focused on a remotely located subject. According to that application, a pendulous member swings relative to the optical axis of an objective lens to an aspect corresponding to focal distance as determined by the inclination of the axis, when the camera is aimed at the base of a subject. The objective lens is then moved by direct manually-applied torque to a predetermined distance from the pendulous member to cause the objective lens to be focused on the subject.

The mechanism described is satisfactory for use in a semiautomatic mode. However, manual focusing of the objective lens by scale, based on accurate distance measurements or estimates, is often desirable. Although the objective lens may be manually adjusted, the mechanism does not permit easy manual adjustment of its objective lens without first inclining the camera to cause the pendulous member to assume an extreme position.

The present mechanism includes a pendulous member arranged for swinging movement relative to the housing of a camera having an objective lens assembly arranged for focusing adjustment relative to a film plane in the housing. A manually operable device having an element external of the housing permits selectively conditioning the pendulous member for free swinging movement and blocking the same against movement when it is desired to manually focus the objective lens.

Thus, an object of the present invention is to provide a new and improved objective lens focusing mechanism including a selectively operable device permitting manual focusing of the objective lens.

Another object of the invention is to provide a novel selector mechanism for selecting whether a focusing mechanism is to be operated in a semiautomatic mode or a manual mode.

Further and other objects will be apparent from the description of the accompanying drawings in which like numerals refer to like parts.

In the drawings:

FIG. 1 is a partial elevational view of a camera incorporating the mechanism of the present invention;

FIG. 2 is an enlarged fragmentary view of the mechanism of the invention as seen in the camera of FIG. 1 with the side plate removed;

FIG. 3 is an enlarged fragmentary view of the pendulous member of the mechanism showing a position assumed with the camera in different aspects;

FIG. 4 is a view of the mechanism, broken away in part to disclose other elements;

FIG. 5 is a sectional view of the mechanism taken along line 5-5 of FIG. 1; and

FIG. 6 is a sectional view of the mechanism taken along line 6-6 of FIG. 1.

Referring now to the drawings, there is shown a portion of a camera 10 with a housing 12 having conventional wall portions including a pair of side wall portions 14, and a front wall portion 16 from which an objective lens assembly 18 extends. This objective lens assembly includes an objective lens 20, positioned substantially concentrically of a lens barrel 22, and defining an optical axis 24. Preferably, objective lens assembly 18 is rotatable on screw threads (not shown) on lens barrel 22, which threads cooperate with similar screw threads (not shown) in the housing. A handle 26 extends from the lens barrel to enable an operator to rotate the barrel and cause movement of objective lens 20 longitudinally of optical axis 24 so as to make the focal plane of the objective lens coincide with a film plane in the camera.

Within the housing 10 and fixed to the lens barrel 22, is an annular member 28 defined by a rearwardly facing reference ledge 28a which in this embodiment is configured as a planar surface, but may be a cam surface. Extending radially from the annular member is a pin 30. An objective lens assembly 18 is rotated, and therefore, is moved axially, pin 30 rotates and moves therewith.

A focusing mechanism 32 cooperates with objective lens assembly 18 to cause semiautomatic adjustment of the focus of objective lens 20. The mechanism includes a pendulous member 36 mounted for free swinging movement about an axle 38 which is supported in a mechanism plate 40 attached within the camera housing. When the pendulous member is in free swinging condition, it will always seek a gravity oriented position regardless of the inclined orientation of the camera's optical axis 24. For this reason, a forward facing edge 44 of the pendulous member is configured with a cam formation corresponding to the angle of inclination of the optical axis between a substantially horizontal line and an angled or hypotenuse line of a right angle. The vertical line of the right triangle is understood to extend vertically below the position of the camera to a point at which it intersects a line extending substantially horizontally from the base of a subject.

A translator or spacer member 50 cooperates with both the cam edge 44 of the pendulous member 36 and the reference surface 28a of annular member 28 to translate the position of the pendulous member into an "in-focus" position of the objective lens. As best seen in FIG. 4, spacer member 50 is fixed to a carrier 54 which is mounted for movement about a stub shaft 56. A spring 58 is connected between the carrier 54 and mechanism plate 40 to urge the carrier rearwardly of the camera wherein spacer member 50 engages cam edge 44 of the pendulous member. Engagement of spacer member 50 against cam edge 44 under the urging of spring 58 locks the pendulous member in any position it has assumed until that pendulous member is to be released.

To enable release of pendulous member 36, pin 30 cooperates with carrier 54 through an inclined surface 59 of a wedge-shaped leg portion 60 to displace spacer member 50 from cam edge 44. When the spacer is displaced while the mechanism is conditioned for semiautomatic focus, pendulous member 36 orients itself to the position required by the orientation of housing 12 at that time. To displace spacer member 50, lens barrel 22 is manually rotated in one direction, counterclockwise as shown in the drawings, to rotate pin 30 against leg portion 60 and into a pocket 62 separating that leg portion from the body portion of carrier 54. When pin 30 engages the wedge-shaped surface of leg portion 60, carrier 54 is urged forward with reference to the camera housing. At the lowest aspect pin 30 reaches in pocket 62, spacer member 50 is clear of edge 44 of the pendulous member in any aspect that member might assume.

After pendulous member 36 assumes a new position, objective lens 20 may be focused by rotating the lens barrel 22 clockwise as far as it will turn. This rotation of the lens barrel frees carrier 54 from the influence of pin 30 and thereby permits spring 58 to urge spacer member 50 against the pendulous member. It is to be understood that lens barrel 22 may be rotated further than that distance required to remove pin 30 from pocket 62. In fact, lens barrel rotation may be continued until ledge 28a of annular member 28 about the lens barrel engages the spacer member. In this condition, objective lens 20 is adjusted so as to be focused on a sighted subject. The focal distance at which objective lens 20 is "in-focus" can then be read through a window 66 when one of the measurement indicia 68 on lens barrel 22 is positioned relative to an index mark 70 fixed in the window.

A selector control 80 enables the user to select between the semiautomatic focusing mode above described, and a manual focusing mode. Control 80 includes a manually manipulatable disk 82 which is rotatable about a shaft 86, coaxial with axle 38, between a pair of positions indicated in FIG. 1 at 87 and 88. A short conditioning stud 90 is fixedly secured to the interior of disk 82 to pass into a cutout 92 formed with an arcuate configuration in pendulous member 36, as seen in FIG. 3. The stud also passes through a notch 94 in mechanism plate 40, which notch determines limits of the path over which stud 90 can be moved wherein an index mark 98 on disk 82 becomes substantially aligned with one of the indicia.

For semiautomatic operation of focusing mechanism 32, disk 82 is positioned with index mark 98 aligned with indicia 87, identified in FIG. 1 as "AUTO". When disk 82 is so rotated, stud 90 (in solid lines in FIG. 3) approaches engagement with the right hand edge of notch 94. With stud 90 so positioned and spacer 50 free of pendulous member 36, the pendulous member may swing relative to housing 12 when the optical axis 24 is inclined. If housing 12 and axis 24 are inclined to the dashed line position seen in FIG. 3, pendulous member 36 will rotate from an initial position relative to axis 24 to another angular position relative to the dashed line camera position. Nevertheless, the pendulous member 36 will be oriented under the influence of gravity. Throughout the relative angle of inclination of the pendulous member to the camera, stud 90 is clear of both edges of cutout 92 in the pendulous member. That is, the pendulous member is not restricted from seeking its gravity oriented position when the "AUTO" position is selected.

Orientation of selector control 80 to align index mark 98 with indicia 88, identified in FIG. 1 as "MANUAL", causes stud 90 to approach engagement with the left edge of notch 94, as oriented in FIG. 3. When stud 90 is in this position, it also engages the left edge of cutout 92 in pendulous member 36.

It is to be understood that the camera of this preferred embodiment is intended to be focused by inclining the optical axis at a downward angle from the scene viewing level of the camera. However, if it were desirable to focus by inclining the optical axis upwardly, notch 94 and cutout 92 could be designed to permit this action. For this description, however, only downward inclination of the axis will be discussed. With stud 90 positioned in engagement with the left edge of cutout 92, pendulous member 36 is blocked against rotational movement upon inclination of the camera, although spacer 50 may be moved clear of the member. In the position in which pendulous member 36 is locked, objective lens assembly 18 can be manually adjusted throughout its focusing range without forcing annular ledge 28, spacer 50 or pendulous member 36. With each of these elements free for adjustment to any desired positions, objective lens assembly 18 can be rotated to align any of the indicia 68 on lens barrel 22 with index mark 70 in window 66. Hence, the objective lens may readily be manually focused to a focal distance determined by either measurement or estimate.

It is to be understood that the embodiments shown are illustrative of the principal operation of a camera focusing mechanism which ensures accurate determination of focal distance and that certain changes, alterations, modifications or substitutions can be made in the structure of the mechanism without departing from the spirit and scope of the claims.

I claim:
1. An improved focusing arrangement for a camera having a housing including an objective lens assembly defining an optical axis and being adjustable for focusing on a subject, by a focusing mechanism operable upon inclining the optical axis at an angle corresponding to focal distance, the focusing mechanism including a cam surfaced pendulous member mounted for movement relative to said optical axis to any of a plurality of positions corresponding to the angular disposition of the optical axis of said objective lens assembly with respect to a subject to be photographed, the improvement comprising a selector control means for selectively blocking said pendulous member against relative movement in a position wherein said objective lens assembly is adjustable independently of orientation of said pendulous member.

2. An improvement as in claim 1 wherein said selector control is positionable in a first position and a second position.

3. An improvement as in claim 2 wherein said selector control includes a manually operable member and a conditioning means movable by said manually operable member and said pendulous member includes receiving means adapted to cooperate with said conditioning means of said selector control when said control is one of said two positions.

4. An improvement as in claim 3, wherein said conditioning means is a stud movably entering said receiver means of said pendulous member.

5. An improved focusing arrangement for a camera having a housing including an objective lens assembly defining an optical axis and being adjustable for focusing on a subject, by a focusing mechanism operable upon inclining the optical axis at an angle corresponding to focal distance, the focusing mechanism including a cam surfaced pendulous member mounted for movement relative to said optical axis to any of a plurality of positions corresponding to the angular disposition of the optical axis of said objective lens assembly with respect to a subject to be photographed, the improvement comprising:
a reference surface on said objective lens assembly;
a spacer member cooperating with said reference surface and said pendulous member to position said surface responsive to orientation of said pendulous member;
a movable carrier supporting said spacer member for movement into and out of operative engagement with said pendulous member;
a leg portion on said carrier having an inclined surface relative to the direction of movement of said carrier;
means adjusted by said objective assembly to cooperate with the inclined surface of said carrier and
whereby when said last named means is adjusted into engagement with said carrier, said carrier moves said spacer out of operative engagement with said pendulous member.

6. An improvement as in claim 5 wherein the carrier is mounted for swingable movement about a fixed pivot.

7. An improvement as in claim 6 including spring means biasing said carrier to move said spacer member into engagement with said pendulous member.

8. An improvement as in claim 5 wherein said means adjusted by said objective lens assembly is a stud, said carrier is biased in one direction, and said spacer is fixed to said movable carrier for movement therewith wherein when said stud engages said inclined surface of said carrier, said carrier moves in a direction opposite the direction in which it is biased therein moving said spacer out of engagement with said pendulous member.